United States Patent [19]
Meyer

[11] 3,914,061
[45] Oct. 21, 1975

[54] ROD RETAINING CLIP

[75] Inventor: Engelbert A. Meyer, Union Lake, Mich.

[73] Assignee: USM Corporation, Boston, Mass.

[22] Filed: May 30, 1974

[21] Appl. No.: 474,304

[52] U.S. Cl. ............... 403/197; 403/243; 403/361; 403/372
[51] Int. Cl.² ..................... F16B 9/00; F16L 41/00
[58] Field of Search .......... 403/361, 371, 372, 119, 403/164, 188, 193, 197, 243, 316

[56] References Cited
UNITED STATES PATENTS

| | | | |
|---|---|---|---|
| 2,706,664 | 4/1955 | Conrad | 403/316 X |
| 3,164,054 | 1/1965 | Biesecker | 403/163 X |
| 3,231,300 | 1/1966 | Moroney | 403/163 |

FOREIGN PATENTS OR APPLICATIONS

| | | | |
|---|---|---|---|
| 1,555,350 | 12/1968 | France | 403/163 |

Primary Examiner—Werner H. Schroeder
Assistant Examiner—Wayne L. Shedd
Attorney, Agent, or Firm—Aubrey C. Brine; Vincent A. White; Richard B. Megley

[57] ABSTRACT

A unitary clip reliably locks the angular end of an actuating rod or the like to a receiving member such as a lever to be actuated. The clip, which may be all metal, all plastic, or partly of plastic, comprises a socket portion axially slotted to receive an angular end of the rod and to be seated in an opening of the lever, and a radially extending locking portion aligned with the socket slot for securing the rod in the socket. Desirably, insertion of the rod in the clip socket portion locks the latter to the lever by a snap fit arrangement, and the locking portion then engages three sides of the rod to retain it. The invention has utility especially in the assembly of door locks of vehicles.

6 Claims, 5 Drawing Figures

U.S. Patent  Oct. 21, 1975  3,914,061
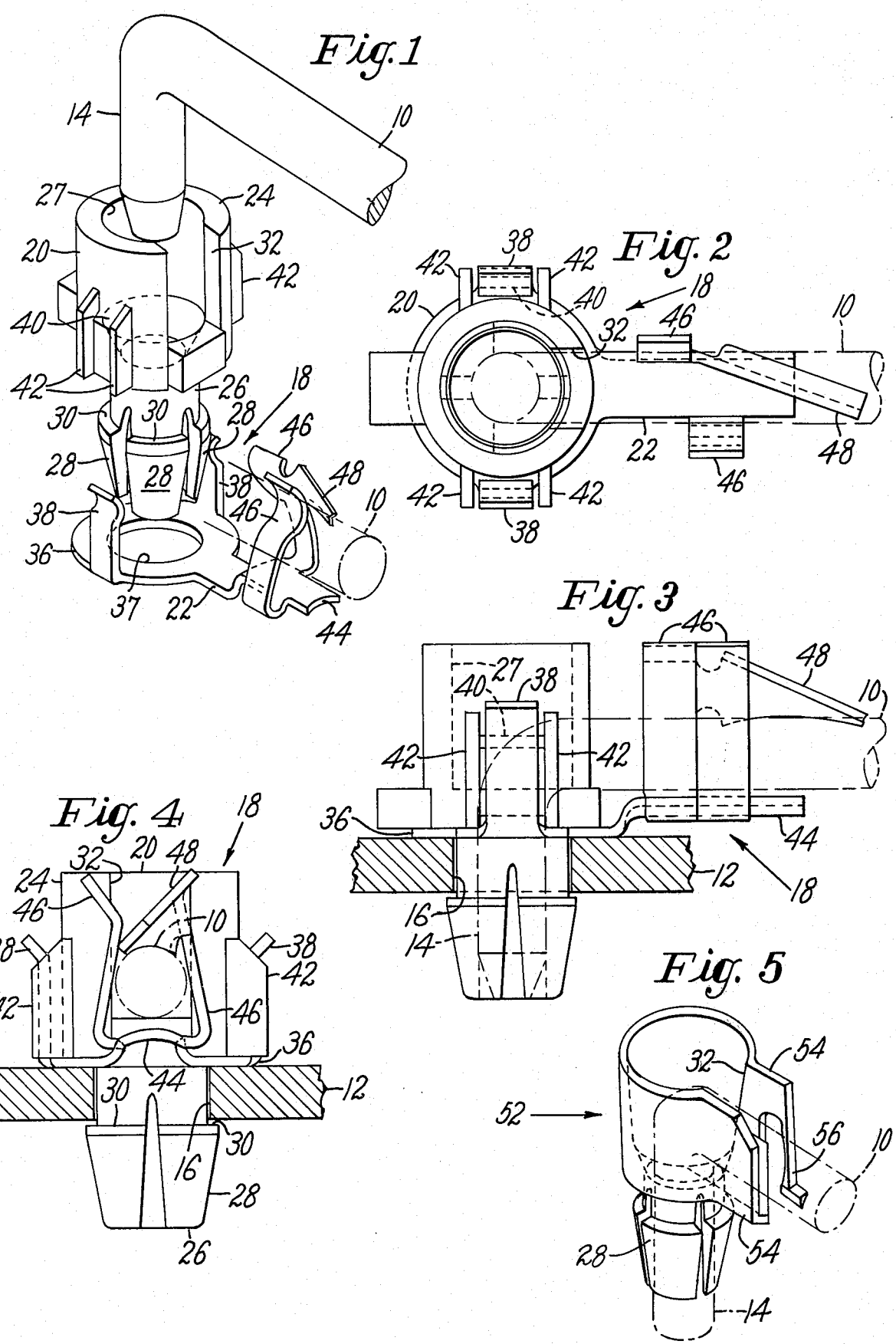

ROD RETAINING CLIP

BACKGROUND OF THE INVENTION

In a common form of automobile door locks a pivotal plate or lock lever is actuated by a displaceable link or rod, the angular end of which is received in a hole formed in the lock lever. Considerable repair work and nuisance is incurred when, after automobile assembly is completed, it is belatedly discovered that a door lock will not function because the rod is disengaged, missing, or never was properly connected to the lock lever. Similarly, other mechanism comprising an elongated actuating member and an element connected to the end of the member for movement thereby are often in need of a retaining or fastening means for (1) making certain all the parts are present and initially connected, and (2) preventing them from becoming disassociated until disassembly is desired.

Various fasteners, threaded and otherwise, have frequently been used to secure parts in pivotal operating relation. Unfortunately repetitive making of threaded and other connections in reliable manner often becomes tedious, and hence many assemblies, especially in assembly line production, may be or quickly become defective. It is found, for instance, that one clip in current use in vehicle door lock assemblies, even though no threading is involved, is at times only partially assembled to the lock lever and a defective assembly and costly repair work are involved.

SUMMARY OF THE INVENTION

In view of the foregoing it is a main object of this invention to provide in a link and lever assembly, or more especially in a rod and socket type mechanism m, a novel clip structure for insuring that the rod must be assembled to the socket in a predetermined and properly mounted manner and moreover if the rod is not thus connected, the rod can not be retained even loosely and the defect is at once apparent.

Another and more specific object of the invention is to provide fastener means for reliably securing a lock lever and door lock rod in operative relation, the lock rod being receivable in the fastener means in but one orientation and such mounting of the lock rod necessarily securing it to the lock lever.

As herein shown a clip, which may be partly of plastic as desired, is first assembled to the lock lever, and then the lock rod orientated as required by an axial receiving slot in the collar or socket portion of the clip has its angular end portion thrust into the socket portion of the clip. A radially extending locking portion of the clip aligned with the axial slot includes gripping means reliably engageable with opposite sides of the rod, and a yieldable locking detent is associated with the gripping means for engaging a third side of the rod when it is received in the socket portion.

Advantageously, the arrangement is such that, for instance, if the end of the rod is not fully seated in the clip socket portion to pivotally anchor the rod and the clip to the lever, the rod can not be in partly assembled relation to the clip and will obviously be unconnected, missing, and required, to be properly presented to hold the parts in working relation.

BRIEF DESCRIPTION OF THE DRAWINGS

The foregoing and other features of the invention together with various other novel details in construction will now be more particularly described in connection with a preferred illustrative embodiment and with references to the accompanying drawings thereof in which:

FIG. 1 is an exploded perspective view of composite clip structure for securing a door lock rod to be pivotally connected to a lock lever;

FIG. 2 is a plan view showing the rod held locked in a socket portion of the clip and in a radially extending locking portion of the clip;

FIG. 3 is a view in side elevation showing the parts of FIG. 2 when the clip has been anchored to a lock lever by the door lock rod;

FIG. 4 is an end view as seen when looking from the right in FIG. 3; and

FIG. 5 is a perspective view of a unitary all-plastic rod retaining clip.

DESCRIPTION OF THE PREFERRED EMBODIMENT

While the exemplary embodiment relates particularly to, and will now be described as applied to, door lock mechanism, it will be understood that the invention is not thus limited but is more generally concerned with provision of improved clip structure for reliably assembling a lever and its' actuating means in convenient manner.

An actuating means in the form of a link or rod 10 (FIGS. 1–4) is to be pivotally connected to a member for instance a lock lever 12 such as partly shown in FIGS. 3 & 4 and commonly employed in the door locks of vehicles. For this purpose the rod 10 has an anchoring end portion 14 preferably tapered and extending at right angles to be received in a hole 16 formed in the lever 12. It will be apparent that the relatively short angular end portion 14 can swing the lever 12 about its pivot (not shown) so long as their interconnection is maintained, but that the rod 10 by itself can easily become disengaged whereupon the lock mechanism becomes inoperative.

A novel clip structure generally designated 18 (FIGS. 1 & 2) next to be described insures that the rod 10 and the lever 12 are properly interconnected and reliably remain so. The clip 18, which may be partly of metal and partly of plastic, may be wholly of either material and may be of one piece or composite structure. For present purposes of illustration only, it is herein assumed the clip 18 comprises a molded plastic socket or collar portion 20 and a metallic locking portion 22. The portions 20, 22 are, in effect, integrated and employed in unison as will later be explained.

The socket portion 20 has a cylindrical collar 24 and coaxial locking bushing 26, both formed with a common bore 27 adapted ultimately to receive the rod portion 14 endwise. The bushing 26 is partly axially split on one end to provide a plurality of circumferential, radially expandable segments 28 defined at their respective inner ends by a peripheral radial shoulder 30. The collar or socket 24 is axially slotted as at 32 to enable the rod 10 to be axially received so that the tapered end 14 of the rod can engage corresponding tapered inner walls 34 of the segments 28, respectively, and thereby dilate the shoulders 30 into latching relation with the locking plate or lever 12 adjacent to the periphery of the hole 16. It will be understood that the length of the slot 32 is adequate to allow the segment shoulders 30 to snap into latching relation as indicated in FIGS. 3–4.

When as herein shown the clip is composite, the metal locking portion 22 thereof may be formed of a single piece of sheet metal one end of which is a ring portion 36 having a central bore 37 (FIG. 1) sized for axially receiving the bushing 26 and being releasably retained thereon by the shoulders 30. At opposite sides of the ring portion 36 upstanding spring arms 38, 38 have their free ends V-shaped to cooperatively latch onto shoulder formations 40, 40 respectively molded into the socket 44 between pairs of axial guide ribs 42, 42. It will be understood that for purposes of the invention any other suitable connecting means may be employed if preferred for securing the portions 20, 22 together. The clip 18 has a radially extending locking portion laterally aligned with the slot 32 and comprised of a base 44 integral with the ring portion 36, rod gripping and engaging means in the form of a pair of cooperative yieldable arms 46, 46 upstanding from opposite sides of the base 44, and a rod detent means desirably in the form of at least a single yieldable latch 48 (FIGS. 1–4), preferably bevelled, integral with one of the arms 46. The latch 48 is disposed transversely of the slot 32. Accordingly the arrangement is such that the rod 10, on having its anchor end portion 14 axially seated in the bushing 26, must be gripped on opposite sides by the arms 46 as they are spread apart by the rod, and also be locked into engagement by the latch 48 which crosses over the rod into a closed position for contact with a third side of the rod after having been momentarily deflected thereby into an open position.

FIG. 5 shows a unitary clip structure 52 as made of one material solely; it will be understood that when the clip is thus constituted, portions 54, 54 of the collar 24 laterally extend at opposite sides of the slot 32, in parallel to guide the axial reception of the rod portion 14 into the bore 28, and a locking deflectable latch 56 (corresponding to the latch 48 projecting from at least one of the mentioned lateral extensions 54 of the collar serves as a "crossover" or snap fastener to retain the rod 10 in locked assembly.

Briefly to review usage of the clip 18 in the illustrative embodiment, and assuming the portions 20, 22 are connected together, the bushing 26 is first thrust into the hole 16 in the lever 12, the segment shoulders 30 making an initial snap fit to preliminarily hold the clip to the lever. Next the rod 10 is assembled into the clip 18 to maintain the parts in properly assembled relation. If it is attempted to only partly, incorrectly, or carelessly assemble the rod with the clip 18, the parts can not be held assembled, the rod will at once be allowed to separate and fall from the lever 12, and an inevitable malfunction will be avoided by the then obvious need for immediate corrective action. With the improved clip structure disclosed, the rod 10 must have its angular anchoring end 14 correctly and fully introduced axially into the bushing 26 to lock the latter to the lever 12, and this can only be accomplished by pushing the rod axially down sufficiently into the collar slot 32. Such action necessarily entails that the rod will be securely clipped by the arms 46, 46 to retain against relative axial displacement, and also that the latch 48 will be deflected into open position as the rod passes between the oppositely clipping arms 46 and then be snapped closed over the rod to lock it against axial displacement relative to the clip.

From the foregoing it will be appreciated that the clip 18 provides a simple and economical fastener for insuring reliable connection between a lever and its actuating means. In particular the clip structure affords an easily employed means for making sure that assembly parts, as in a vehicle door lock, are initially assembled and remain assembled in intended operative relation.

Having thus described my invention and what I claim as new and desire to have secured by Letters Patent of the United States is:

1. A clip for securing an angular end portion of a rod in a receiving opening of a lever or the like, the clip comprising an axially slotted socket portion adapted to receive the rod end and to be secured in the opening, and a radially extending locking portion secured to the socket portion and having rod gripping means at a locally radially beyond said slotted socket portion and aligned with the axial slot for releasably engaging opposite sides of the received rod, said gripping means including a yieldable locking latch engageable in closed position with a third side of the rod at said locality positively to bar rod retraction from said slotted portion when the angular end is seated in the socket portion.

2. A clip as in claim 1 wherein the radially extending locking portion has its rod gripping means in the form of upstanding resilient arms, radially offset and spaced to be spread apart when the rod is moved into the axial slot of said socket portion, and said locking latch is connected to the free end of one of said arms and disposed transversely of the slot substantially to span the thickness of the rod in said locality and prevent rocking of the rod in said socket portion.

3. In a door locking mechanism comprising a lever formed with an opening and an actuating rod having an angular, tapered end portion to be secured therein, a clip comprising a tubular collar portion adapted to receive the angular end portion of the rod endwise and a locking portion projecting radially beyond said collar portion, the collar portion being axially slotted to allow the tapered end portion of the rod to engage and coact with a portion of the clip to secure the latter to the lever, said radial locking portion of the clip being aligned with the slot of the collar portion and having latching means integral therewith and engageable with three sides of the rod and closable thereon to retain it at a locality remote from its angular end portion when the latter is secured to the lever.

4. In a lock mechanism comprising a lever having an opening and a rod formed with an end portion adapted to be releasably secured to the lever when thrust into said opening, a clip including a tubular collar portion for receiving the end portion of the rod, and a radial rod locking portion cooperative with the rod at a point remote from its end portion to prevent removal of the latter from said collar portion, said radial rod locking portion of the clip including rod latching means integral therewith and angularly aligned with an axial slot in the clip collar portion sized to receive transversely a portion of said rod, said rod latching means comprising a yieldable latch closable on the rod and extending in a direction transversely of said slot.

5. Lock mechanism as in claim 4 wherein the clip is composite, the clip collar portion is of plastic, and the clip rod locking portion is of sheet metal secured to the collar portion.

6. Lock mechanism as in claim 4 wherein said rod latching means includes a pair of yieldingly cooperative rod contacting arms generally parallel to the slot, and one of said arms supports said yieldable latch to firmly restrain the rod.

* * * * *

UNITED STATES PATENT OFFICE
CERTIFICATE OF CORRECTION

Patent No. 3,914,061   Dated October 21, 1975

Inventor(s) Engelbert A. Meyer

It is certified that error appears in the above-identified patent and that said Letters Patent are hereby corrected as shown below:

Column 4, Cl. 1, Lines 14 and 15, change locally to
--locality--

Signed and Sealed this twenty-seventh Day of January 1976

[SEAL]

Attest:

RUTH C. MASON
Attesting Officer

C. MARSHALL DANN
Commissioner of Patents and Trademarks